UNITED STATES PATENT OFFICE.

HUGO HASSENCAMP, OF ELBERFELD, GERMANY, ASSIGNOR TO THE FARBENFABRIKEN, VORMALS FR. BAYER & CO., OF SAME PLACE.

TRIPHENYLMETHANE DYE.

SPECIFICATION forming part of Letters Patent No. 498,471, dated May 30, 1893.

Application filed January 19, 1893. Serial No. 458,904. (Specimens.) Patented in France October 27, 1891, No. 217,020, and in England November 4, 1891, No. 19,062.

*To all whom it may concern:*

Be it known that I, HUGO HASSENCAMP, doctor of philosophy, chemist, (assignor to the FARBENFABRIKEN, VORMALS FR. BAYER & CO., of Elberfeld,) a subject of the Emperor of Germany, residing at Elberfeld, Germany, have invented a new and useful Improvement in the Manufacture of Coloring-Matters Belonging to the Series of Triphenylmethane Dye-Stuffs, (for which the aforesaid FARBENFABRIKEN have already obtained Letters Patent in France, No. 217,020, dated October 27, 1891, and in England, No. 19,062, dated November 4, 1891,) of which the following is a specification.

My invention relates to the production of a new triphenylmethane dye-stuff by combining molecular proportions of tetramethyldiamidobenzhydrol and dibenzylanilin disulpho acid which possesses the following compositions:

and by oxidizing the thus produced leuco compound of the formula:

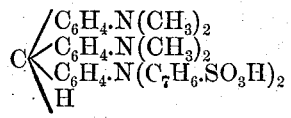

into the dye-stuff acid and converting the latter into its sodium salt, which possesses the following composition:

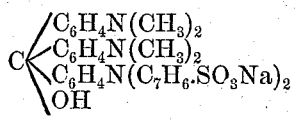

In carrying out my process practically I proceed as follows: I prepare dibenzylanilin disulpho acid, for instance, by introducing dibenzylanilin into four times its weight of fuming sulfuric acid containing twenty-five per cent. of anhydride, while the mixture is kept at a low temperature. When the dibenzylanilin has dissolved, the liquid is poured on ice and the formed dibenzylanilin disulpho acid is isolated by liming. 4.33 kilos, by weight, of the dibenzyl anilin disulpho acid are redissolved in water and the resulting liquid is mixed with a watery solution of the sulfuric salt of tetramethyldiamidobenzhydrol obtained from 2.7 kilos, by weight, of tetramethyldiamidobenzhydrol by dissolving in forty kilos, by weight, of sulfuric acid (containing five per cent. of pure acid). The liquid is heated on the water bath, until the reaction is completed and the leuco product of the aforesaid formula is formed. By neutralizing the sulfuric solution with sodium carbonate and after cooling the sodium salt of the leuco compound separates as a resinous mass. The oxidation of the aforesaid leuco compound is best effected by means of lead dioxid in acetic solution. In order to carry out this oxidation, I dissolve the resulting condensation product in twenty kilos, by weight, of acetic acid (containing fifty per cent. of pure acetic acid) and add thereto with stirring 4.8 kilos, by weight, of a lead dioxid paste (containing fifty per cent. of lead dioxid). In this manner the oxidation easily proceeds. After decomposing the lead salts dissolved by means of sodium sulfate and filtering off the lead sulfate, the filtrate thus obtained is mixed with common salt and the dye-stuff is thereby precipitated as sodium salt which can be filtered off, pressed and dried. My new dye-stuff thus produced forms a mass of yellowish bronze-like luster and is after pulverizing a dark violet powder. It easily dissolves in water with from violet to deep blue color. It is also soluble in alcohol with violet color. In ammonia it dissolves with greenish-blue, in sodium carbonate with reddish-blue color, while it is dissolved by soda-lye with dull blue color. On heating the alkaline solutions become clearer and the solution in soda-lye becomes perfectly colorless. By adding acetic acid in a small excess to the alkaline solutions the original violet color again appears, no precipitate being separated. It dissolves in diluted hydrochloric acid with yellowish-brown color which on adding water at first becomes moss-green, then greenish-blue. By diluted sulfuric acid it is dissolved with green color which is not altered by an addition of water. When its watery solutions are mixed with ammonia, sodium carbonate or soda-lye they assume a brighter color, while an addition of acetic acid to the alkaline solutions again produces the original color. On adding hydrochloric acid to its solutions in water the color becomes bluish-green, then moss-green and if a great quantity of hydrochloric acid be employed, the color turns into greenish-yellow. When diluted sulfuric acid is added to its watery solution the color becomes pure blue and the coloring-matter is partially precipitated, while on the addition of sulfuric acid in excess a green color results. By concentrated sulfuric acid it is dissolved with reddish-yellow color which remains on adding a small quantity of ice water, while the addition of a greater quantity of water changes the color at first into green and then renders the liquid colorless. It is suitable for dyeing wool in a sulfuric bath and is easily fixed on the fiber, which assumes a violet color similar to that produced by methyl-violet 5 B. The colors resulting are fast against the action of fulling and possess a sufficient fastness to the action of alkalies. Concentrated ammonia, for instance, produces on the fiber dyed therewith a light-colored place, but the original violet color again appears as soon as the ammonia employed is evaporated.

Having thus described my invention and in what manner it can be performed, that which I claim as new, and desire to secure by Letters Patent, is—

1. The process for producing a new triphenylmethane dye-stuff by combining equimolecular proportions of tetramethyldiamidobenzhydrol and dibenzylanilin disulpho acid or salts thereof and by further oxidizing the resulting leuco compound.

2. As a new product the triphenylmethane dye-stuff having the formula:

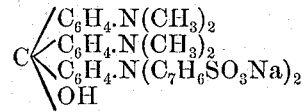

forming a dark violet powder, soluble in water and alcohol with violet, in ammonia with greenish-blue, in sodium carbonate with reddish-blue, and in soda-lye with dull blue color; its alkali solutions become clearer on heating, and its solution in soda-lye perfectly colorless, the original color being, however, restored on the addition of acetic acid in slight excess; soluble in dilute hydrochloric acid with yellowish-brown color, which on addition of water first turns moss-green, then greenish-blue; soluble in dilute sulfuric acid with green color, which is not altered on addition of water; soluble in concentrated sulfuric acid with reddish-yellow color, which does not change on addition of a small quantity of ice water, while an excess of water changes the color at first into green, and then renders the solution colorless; and having the qualities substantially as specified.

HUGO HASSENCAMP.

Witnesses:
WM. ESSENWEIN,
RUDOLPH FRICKE.